United States Patent [19]

Shafirkin

[11] Patent Number: 5,080,522

[45] Date of Patent: Jan. 14, 1992

[54] DEVICE FOR LOCKING AND SEALING OF OBJECTS

[76] Inventor: David I. Shafirkin, ulitsa Egerskaya,5,kirpus 1,kv.110, Moscow, U.S.S.R.

[21] Appl. No.: 447,175

[22] Filed: Dec. 7, 1989

[30] Foreign Application Priority Data

Dec. 13, 1988 [SU] U.S.S.R. .............................. 4643406

[51] Int. Cl.$^5$ .............................................. E16B 21/16
[52] U.S. Cl. ..................................... 403/326; 403/361; 403/2
[58] Field of Search ............... 403/326, 328, 321, 355, 403/377, 361, 2, 365, 367

[56] References Cited

U.S. PATENT DOCUMENTS

| | | | |
|---|---|---|---|
| 3,857,642 | 12/1974 | Miller | 403/361 X |
| 3,984,132 | 10/1976 | Sarson | 403/2 X |
| 4,142,543 | 3/1979 | Krause et al. | 403/326 X |
| 4,277,199 | 7/1981 | Livesay | 403/326 X |
| 4,647,242 | 3/1987 | Chang | 403/326 X |
| 4,966,488 | 10/1990 | Mayhew | 403/326 X |

FOREIGN PATENT DOCUMENTS 3993842 11/1985 U.S.S.R. .

*Primary Examiner*—Peter M. Cuomo
*Attorney, Agent, or Firm*—Burgess, Ryan & Wayne

[57] ABSTRACT

A device for locking and sealing of objects comprises a locking rod with a stop on its one end, and with a homing head in the form of a truncated cone on the other end, provided with a circular groove made in the locking rod on the side of the major base, and a bowl-shaped catch mounted in a casing and intended for positioning on the locking rod on the side of the homing head. At least one spliced locking ring is positioned in the cavity of the catch so that it engages with the locking rod when it is positioned in the circular groove thereof. The device is provided with an arrangement for ensuring the programmed force of destruction of the catch.

1 Claim, 4 Drawing Sheets

DEVICE FOR LOCKING AND SEALING OF OBJECTS

FIELD OF THE INVENTION

The present invention relates to metal productware, and more specifically, to a device for locking and sealing of objects.

It is most expedient that the proposed invention be used for locking and sealing of railway wagons and various containers.

BACKGROUND OF THE INVENTION

A device is well known in the prior art to be used for locking and sealing of an object which is manufactured by ONESEAL A/S (Denmark) and comprises a locking rod and a catch. One end of the locking rod is provided with a stop, and the other one, with a homing head in the form of a truncated cone. On the side of the major base of the homing head there is provided a circular groove on the locking rod. The catch designed to be positioned on the locking rod is shaped as a bowl and it is mounted in a casing. A spliced locking ring is mounted in the cavity of the catch. Said spliced locking ring is mounted in a circular groove provided in the inside surface of the catch, and it engages with the homing rod when placed in its circular groove.

The prior art device allows the guarded object to be locked manually, it carries the required information (the number of the device, the name of the manufacturing company). However, this device is characterized by low reliability of locking the guarded object, because the principle used to destroy the locking rod during the authorised unblocking of the device imposes limitations on the strength of the locking rod and on that of the device as a whole. Aside from that, the spliced locking ring used in this device is provided with a recess along its circumference which is required for positioning the ring in the catch. This allows the device to be removed rather quickly the device from the guarded object during the unauthorised unblocking of the device with certain combinations of direction of the breaking force applied to the catch to remove it from the locking rod and the position of the recess on the locking ring, and allows to lock it repeatedly on the guarded object.

OBJECTS AND SUMMARY OF THE INVENTION

The object of the invention is to ensure considerable strength and reliability of locking an object.

Another object of the invention is to rule out the possibility of repeated use of the device after it has been removed without authorisation.

These and other objects of the invention are attained by a device for locking and sealing of objects, comprising a locking rod provided with a stop at one of its ends and provided with a homing head shaped as a truncated cone at the other end thereof, a circular groove being provided in the locking rod on the side of the major base of the homing head; a bowl-shaped catch mounted in a plastic casing and designed to be positioned on the locking rod on the side of the homing head; and at least one spliced locking ring housed in the cavity of the catch and which engages with the locking rod when the spliced locking ring is positioned in the circular groove thereof, and according to the present invention, is provided with a means for ensuring a programmable force of destruction of the catch.

Such structural embodiment of the device as described herein provides for the destruction of the catch, and not of the locking rod. This allows the device to be manufactured without limiting its strength and use it repeatedly as compared with the design of the known ONESEAL device which is unblocked by shearing the locking rod.

It is expedient that the means which provides for the programmable force of destruction on the catch be made in the form of a circular groove in the end face surface of the catch on the side of the homing head.

The provision of said means in the form of a circular groove is most convenient technologically and is characterized by a relatively high reliability of destruction of the catch in the programmed place. By varying the depth of the circular groove, it is possible to program the necessary rupture force of the catch.

In those cases where the catch used in the device is provided with relatively thin end face walls, it is necessary that said means be provided with a breaking ring positioned in the cavity of the catch between the spliced locking ring and the inside surface of the end face wall of the catch on the side of the homing head, and the outer diameter of the breaking ring should be therewith larger than the outer diameter of the spliced locking ring, but not larger than the diameter of the circular groove, whereas the catch should be made of two parts rigidly connected with each other.

The provision of a breaking ring safeguards the spliced locking ring from deformation, whereas the diameter range of the breaking ring specified above provides for the working condition of the device. The provision of a sectional catch is necessary according to technological requirements so that it is possible to position the breaking ring in the cavity of the catch.

In order to attain still greater strength of the device and respectively of the catching force with which the homing head is retained by the spliced locking ring, it is necessary that the inner surface of the breaking ring on the side of the end face oriented towards the spliced locking ring be of conical shape.

Said means can be provided with an additional circular groove in the end face surface of the catch on the side opposite to the homing head.

The provision of an additional circular groove allows to unlock the proposed device by squeezing the locking rod out of the catch.

It is expedient that the device be provided with a data tag connected rigidly to the casing of the catch.

Such provision will make it possible to record the required sealing and other data, e.g. the number of transport vehicle, immediately before the hanging of the device on the guarded object.

So the claimed device for locking and sealing of the objects thus guarded, as implemented according to the present invention, allows to make more reliable the blocking of the doors of the guarded objects and allows for a higher quality sealing at the same time, as well as it allows to increase drastically the force needed to break the catch from the locking rod during the unauthorised removal of the device. Use made in the present device of the principle according to which the catch is destroyed during the authorised unblocking allows to increase drastically the strength of the locking rod and to use it repeatedly. Depending on the value of the contents in the object thus guarded, the design of the device allows to program the necessary unblocking force and conceal this from being detected, and, aside from that, it does not allow to hang the device back on the object again after is has been unblocked. The provision of the data tag in this design makes it possible to register information thereon immediately before the hanging of the device on the guarded object, said information including such data as the number of the transport vehicle, the coded name of the responsible person nominated by the consignor, the coded name of the place of destination and so on. Since this information is recorded prior to dispatching the consignment makes it possible to avoid strict material accounting while storing the proposed devices for locking and sealing of objects. The device according to the present invention can be removed only by means of a special attachment.

BRIEF DESCRIPTION OF THE DRAWINGS

The present invention is explained by a detailed description of a specific embodiment thereof with reference to the accompanying drawings, in which.

SPECIFIC EMBODIMENTS

Figure 1:
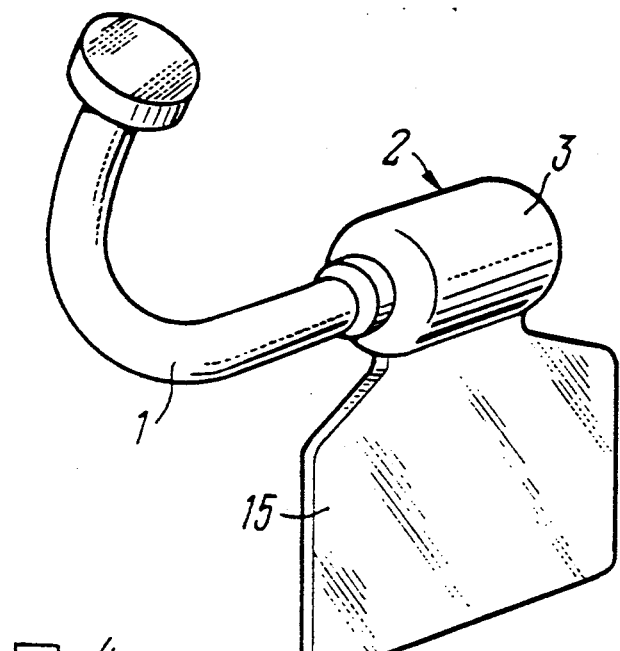
FIG. 1 shows a general perspective view of the device for locking and sealing of objects according to the invention.
Figure 2:
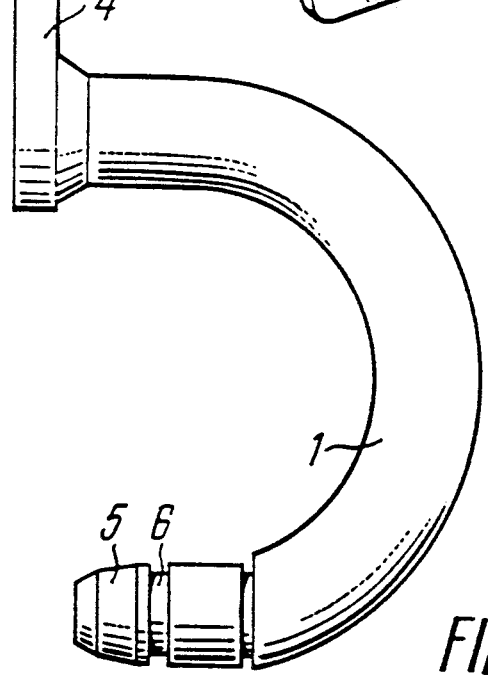
FIG. 2 shows a side view of the locking rod according to the invention.

A device for locking and sealing of objects, according to the present invention, comprises a locking rod 1 (FIG. 1) shaped as, for instance, a bow, and a catch 2 arranged to be disposed in a casing 3 which in this particular embodiment is made of plastic material. One end of the locking rod 1 is provided with a stop 4 (FIG. 2), whereas the other end thereof is provided with a homing head 5 shaped as a truncated cone. The locking rod 1 is provided with a first circular groove 6 made therein on that side of the homing head 5 where its major base is.

The catch 2 (FIG. 3) is shaped as a bowl and consists of two rigidly coupled parts, one of which is a cover 7, whereas the other one is a blind flange 8 forming a cavity therebetween. The cover 7 is provided with a hole 9 which is intended for letting the homing head 5 of the locking rod 1 therethrough. A spliced locking ring 10 is arranged to be positioned inside the cavity of the catch 2.

This device is provided with a means for ensuring the programmable force needed for destructing of the catch 2 which is essentially in the form of a second circular groove 11 formed in an outer surface of an end face wall of the catch 2 on the side of the homing head 5.

Figure 3:
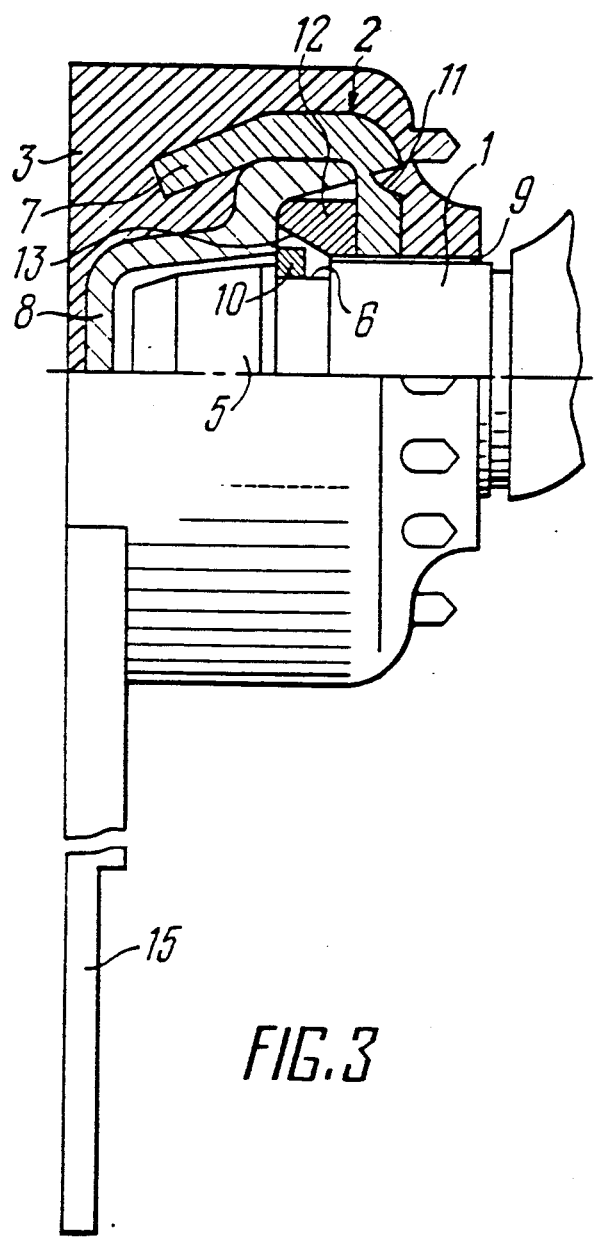
FIG. 3 shows a longitudinal sectional view of a catch according to the invention positioned on the homing head.
Figure 4:
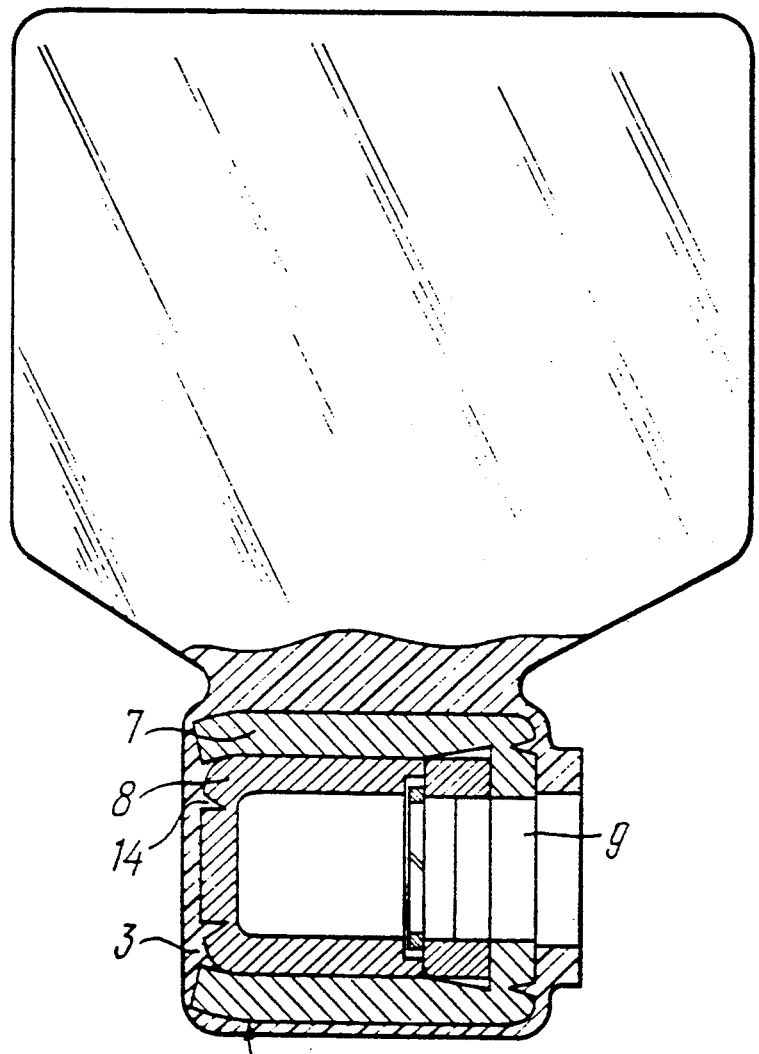
FIG. 4 shows a longitudinal sectional view of catch according to the invention with an additional circular groove.

In order to prevent the spliced locking ring 10 from deforming, a breaking ring 12 is provided to be installed in the cavity of the catch 2. The outer diameter of the breaking ring 12 is larger than the outer diameter of the spliced locking ring 10, but it is not larger than the diameter of the second circular groove 11. The breaking ring 12 is positioned in the cavity of the catch 2 between the spliced locking ring 10 and an inner surface of the end face wall of the catch 2 on that side thereof where the homing head 5 is disposed. The hole of the breaking ring 12 can be either a cylindrical one, as shown in FIG. 4, or a partially conical one, as shown in FIG. 3. The conical shape of the inner surface 13 of the breaking ring 12 on the side of the end face oriented towards the spliced locking ring 10 makes the device even still stronger.

The present device can be provided with an additional circular groove 14 (FIG. 4) in the end face surface of the blind flange 8. The provision of this additional groove 14 allows to unblock the proposed device by squeezing the locking rod 1 (FIG. 1) out of the catch 2.

In order to record the required sealing and other information, the device is provided with a data tag 15 cast as one piece with the plastic casing 3 of the catch 2.

The device works in the following way.

Figure 5:
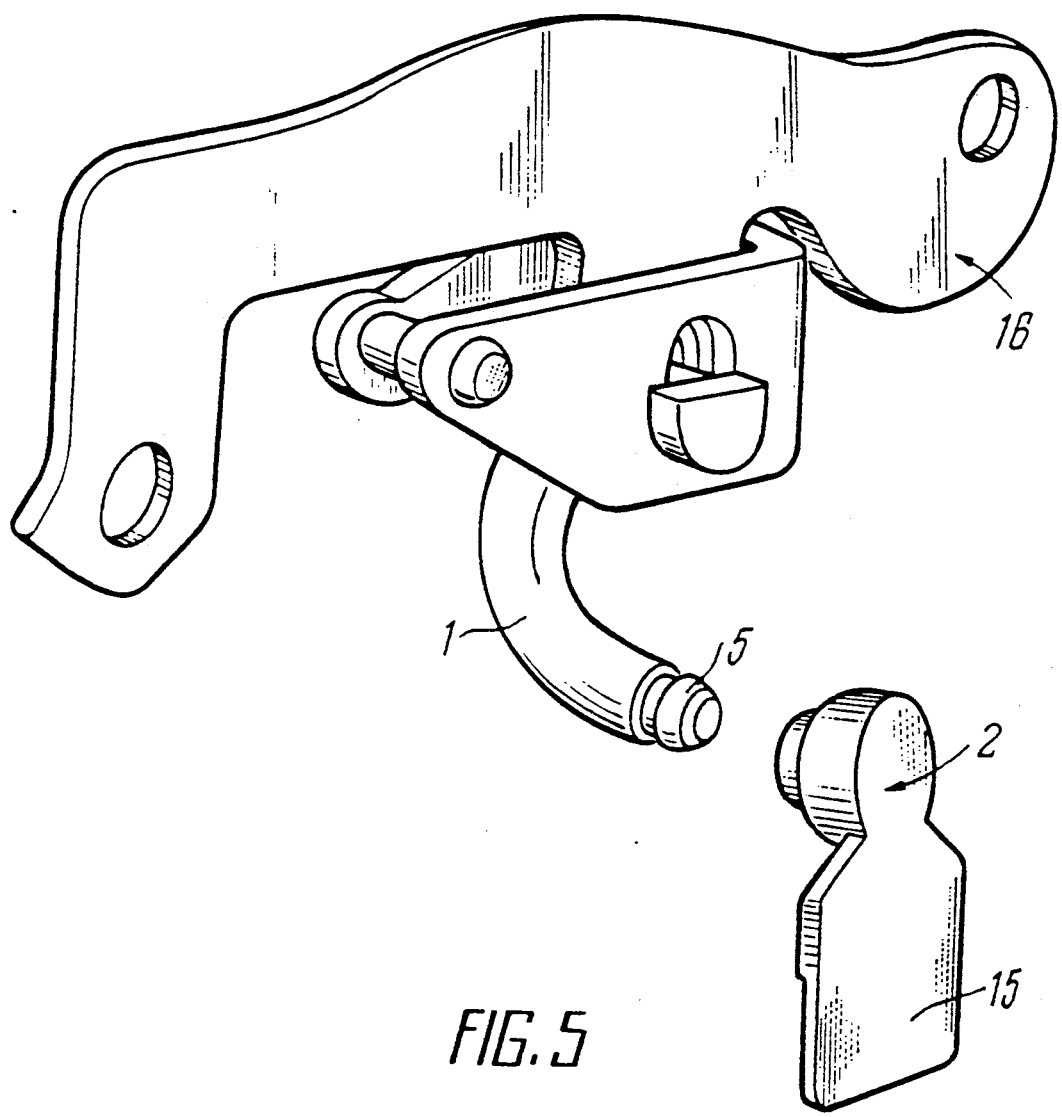
FIG. 5 is an exploded view of the device according to the invention before it is locked on guarded object.

Before the device is hung on the guarded object, e.g. a railway wagon or a container, appropriate sealing marks are recorded by stamping on the data tag 15, whereupon the homing head 5 of the locking rod 1 (FIG. 5) is entered into the hole provided in the cover plates 16 of the railway wagon or the container, then the homing head 5 of the locking rod 1 is introduced into the hole 9 (FIG. 3) of the catch 2 and by pressing with the locking rod 1 upon the catch 2, the latter is locked manually on the homing head 5 of the locking rod 1. In so doing, the spliced locking ring 10 opens up when it comes into contact with the tapered surface 13 of the breaking ring 12, and then it grips to enter the circular groove 6 of the locking rod 1.

The unlocking (removal) of the device is effected by means of a special remover (not shown), which is used to tear the catch 2 off the locking rod 1. The cover 7 breaks along the weak section due to the provision of the circular groove 11, and, in doing so, the breaking ring 12 serves to increase the shearing force. The device can be also unblocked by squeezing the locking rod 1 out of the catch 2, and this is also effected by means of a special remover which is to be introduced into the cavity of the catch 2 (FIG. 4) through the weakened section provided in the blind flange 8 due to that the circular groove 14 is formed appropriately therein, said special remover acting directly upon the homing head 5 (FIG. 3), rather than upon the locking rod 1 proper.

I claim:

1. A device for locking and sealing an object, comprising:
    a locking rod;
    a stop provided on one end of said locking rod;
    a homing head shaped as a truncated cone having a major base and provided on the other end of said locking rod;
    a first circular groove provided in said locking rod on the side thereof where the major base of said homing head is disposed;
    a casing;
    a bowl-shaped catch mounted in said casing and having an end face wall disposed toward said homing head, said catch having a cavity and adapted to be positioned on said locking rod on the side thereof where said homing head is disposed;
    at least one spliced locking ring insertable within the cavity of said catch and adapted to engage said locking rod when the locking ring is positioned in said first circular groove;

means for enabling the catch to be destroyed without destroying the locking rod;

wherein said catch destroying means further comprises a breaking ring positioned within the cavity of said catch between said splice locking ring and an inner surface of the end face wall of said catch, wherein the outer diameter of said breaking ring is larger than the outer diameter of said spliced locking ring, and smaller than the diameter of a second circular groove formed in an outer surface of the end face wall of said catch, said catch comprising two parts rigidly connected to each other; and wherein the breaking ring has a conical-shaped inner surface on a side disposed toward and spaced from said spliced locking ring.

* * * * *